US012380411B2

(12) United States Patent
Sharma

(10) Patent No.: US 12,380,411 B2
(45) Date of Patent: Aug. 5, 2025

(54) RECYCLABLE PRODUCT, TRACKING DEVICE AND METHOD OF TRACKING A RECYCLABLE PRODUCT

(71) Applicants: Sony Group Corporation, Tokyo (JP); Sony Europe B.V., Weybridge (GB)

(72) Inventor: Vivek Sharma, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 371 days.

(21) Appl. No.: 17/792,871

(22) PCT Filed: Feb. 22, 2021

(86) PCT No.: PCT/GB2021/050428
§ 371 (c)(1),
(2) Date: Jul. 14, 2022

(87) PCT Pub. No.: WO2021/198637
PCT Pub. Date: Oct. 7, 2021

(65) Prior Publication Data
US 2023/0051115 A1 Feb. 16, 2023

(30) Foreign Application Priority Data

Mar. 31, 2020 (GB) ..................... 2004770

(51) Int. Cl.
*G06Q 10/30* (2023.01)
*H04W 4/029* (2018.01)
(52) U.S. Cl.
CPC ............ *G06Q 10/30* (2013.01); *H04W 4/029* (2018.02)
(58) Field of Classification Search
None
See application file for complete search history.

(56) References Cited

U.S. PATENT DOCUMENTS 9,108,797 B1\* 8/2015 Borges ................... G06Q 10/30
2005/0128074 A1\* 6/2005 Culpepper ............ H04W 4/027
340/539.1

(Continued)

FOREIGN PATENT DOCUMENTS

EP 3579157 A1 12/2019
JP 2004227312 A 8/2004
(Continued)

OTHER PUBLICATIONS

Novoseltseva, Top 8 Innovative Recycling Apps that make a difference, Published on Jan. 20, 2020 available at: <https://apiumhub.com/tech-blog-barcelona/innovative-recycling-apps/> (Year: 2020).\*

(Continued)

*Primary Examiner* — Richard W. Crandall
(74) *Attorney, Agent, or Firm* — Tucker Ellis LLP

(57) ABSTRACT

A method of tracking a recyclable product includes activating one or more communications devices embedded within or attached to at least one part of the recyclable product. The one or more communications devices include circuitry configured to monitor a location of the at least one part of the recyclable product, and to communicate via a wireless communications network. In response to the one or more communications devices being activated, the one or more communications devices switch from an inactive state in which the one or more communications devices do not transmit an indication of the location of the at least one part of the recyclable product to a recycling state in which the one or more communications devices transmit the indication of the location of the at least one part of the recyclable product to a tracking entity via the wireless communications network. An arrangement is provided in which a product may be recycled by a party which is independent from the consumer of the product and a manufacturer of the product and the recycling may be tracked by the consumer or another entity to monitor a recycling of the product.

19 Claims, 18 Drawing Sheets

(56) References Cited

U.S. PATENT DOCUMENTS

| | | |
|---|---|---|
| 2007/0254626 A1 | 11/2007 | Ahlgren |
| 2010/0017276 A1 | 1/2010 | Wolff |
| 2010/0161397 A1 | 6/2010 | Gauthier et al. |
| 2016/0098690 A1* | 4/2016 | Silva .................... G06Q 20/18 705/21 |
| 2016/0302039 A1 | 10/2016 | Culpepper et al. |
| 2019/0392385 A1 | 12/2019 | Holatz |

FOREIGN PATENT DOCUMENTS

| | | | |
|---|---|---|---|
| JP | 2016189182 A | 11/2016 | |
| WO | 96/26614 A1 | 8/1996 | |
| WO | WO-2008058443 A1 | 5/2008 | |
| WO | WO-2011100147 A1 | 8/2011 | |
| WO | WO-2012048426 A1 | 4/2012 | |
| WO | WO-2013187686 A1 * | 12/2013 | ............. G06Q 10/30 |
| WO | 2014036563 A1 | 3/2014 | |

OTHER PUBLICATIONS

Smart Recycling Bin Determines the Material Type of your Waste, [online] Materialdistrict.com, published Nov. 8, 2017, available at: < https://materialdistrict.com/article/smart-recycling-bin-material/ > (Year: 2017).*

Radio-frequency identification Wikipedia article https://en.wikipedia.org/w/index.php?title= Radio-frequency _identification &oldid= 943440275 Mar. 1, 2020 Retrieved From Internet Dec. 8, 2023.

International Search Report from corresponding International Application No. PCT/GB2021/050428, mailed on Jul. 8, 2021, 2 pages.

* cited by examiner

RECYCLABLE PRODUCT, TRACKING DEVICE AND METHOD OF TRACKING A RECYCLABLE PRODUCT

BACKGROUND OF THE INVENTION

Field

The present technique relates to recyclable products, tracking devices and methods of tracking recyclable products.

The present application claims the Paris convention priority to UK patent application number 2004770.0, the contents of which are incorporated by reference in their entirety.

Example embodiments can provide a recyclable product in which one or more communications devices are embedded and a tracking device can be used to track a location of the one or more communications devices.

Description of Related Art

The background description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Many products are capable of being recycled including electronic products, glass, paper, metal and so on. Such products may be referred to as "recyclable products". Typically, consumers can select to recycle recyclable products by placing them in a designated recycle waste container. The recyclable products are then delivered to a recycling entity for recycling and the recyclable products are re-processed into new products. However, the consumer is given no indication as to the outcome of the recycling process. In particular, the consumer is not provided with details of the disassembly of the recyclable product or the eventual destination of the individual components of the recyclable product. In addition, the consumer is given no guarantee that the product was successfully recycled. Furthermore the recycling entity receiving the recyclable product may not be able to re-process the recyclable product optimally. In particular, different recycling entities may prefer to recycle different materials associated with different recyclable products and may prefer to use specific disassembly procedures which may only be appropriate for specific recyclable products. Accordingly, with growing global interest in the welfare of the environment, there is a desire for an improved transparency of the recycling process.

Providing improvements which facilitate recycling of products efficiently can therefore represent a technical challenge.

SUMMARY OF THE INVENTION

Embodiments of the present technique can provide a method of tracking a recyclable product. The method includes activating one or more communications devices embedded within or attached to at least one part of the recyclable product. The one or more communications devices include circuitry configured to monitor a location of the at least one part of the recyclable product, and to communicate via a wireless communications network. In response to the one or more communications devices being activated, the one or more communications devices switch from an inactive state in which the one or more communications devices do not transmit an indication of the location of the at least one part of the recyclable product to a recycling state in which the one or more communications devices transmit the indication of the location of the at least one part of the recyclable product to a tracking entity via the wireless communications network.

Other embodiments of the present technique can provide a method performed on a computing device operated by a recycling entity to determine whether to recycle a recyclable product with one or more communications devices embedded within or attached to at least one part of the recyclable product. The computing device receives, from a tracking entity via a wireless communications network, an indication of a location of the at least one part of the recyclable product and an identity of at least the one part of the recyclable product. The computing device calculates, on a basis of at least one of: recycling processes available to the recycling entity, the identity of the at least one part of the recyclable product and the indication of the location of the at least one part of the recyclable product received from the tracking entity, a request parameter to be used to determine whether to recycle the recyclable product.

Embodiments of the present technique can provide a method or system in which a product may be recycled by a party which is independent from the consumer of the product and a manufacturer of the product and the recycling may be tracked by the consumer or another entity to monitor a recycling of the product.

Various further aspects and features of the present technique are defined in the appended claims.

With the development of low complexity devices supporting the "Internet-of-Things", the present inventors have recognised the potential for tracking recyclable products to improve the transparency of the recycling process.

Systems may be expected to support further enhancements related to Industrial Internet of Things (IIoT) in order to support services with new requirements of high availability, high reliability, low latency, and in some cases, high-accuracy positioning.

US 2010/0017276 A1 discloses a system, computer program product for managing and tracking recyclable products. The computer program product includes computer codes for uniquely associating one or more recyclable products with unique identifiers and other product information stored in a database.

For the purposes of this disclosure, a "recyclable product" is regarded as a product which is recyclable either wholly or in part. It will be appreciated that the process of "recycling" includes at least one or more of the following examples: reusing a product or a component of the product for its original purpose; reusing a product or a component of the product for a different purpose; processing a product or a component of the product to extract raw materials comprising the product; processing a product or a component of the product to alter a grade of raw materials comprising the product. For example, recycling a plastic may involve altering a grade of raw material comprising the plastic to obtain a lower grade plastic. In other examples, raw materials obtained from different products during a recycling process may be blended together as part of the recycling process. The process "recycling" may involve other processes not explicitly listed here as will be appreciated by a person skilled in the art.

Among the advantages of the present technique is the provision of increased consumer control over the recycling process. Previously, the consumer was required to trust that a product which the user placed in a recyclable waste container would be recycled by an appropriate recycling company. The present technique allows the consumer to select an appropriate recycling company from a plurality of potential recycling companies and, by tracking the recyclable product, monitor the location of the recyclable product to verify that the recyclable product was recycled. Further advantages of the present technique will become apparent to the skilled reader through an appreciation of the detailed embodiments described herein.

BRIEF DESCRIPTION OF THE DRAWINGS

For a better understanding of the invention and to show how the same may be carried into effect reference is now made by way of example to the accompanying drawings in which.

DESCRIPTION OF EXAMPLE EMBODIMENTS

Figure 1:
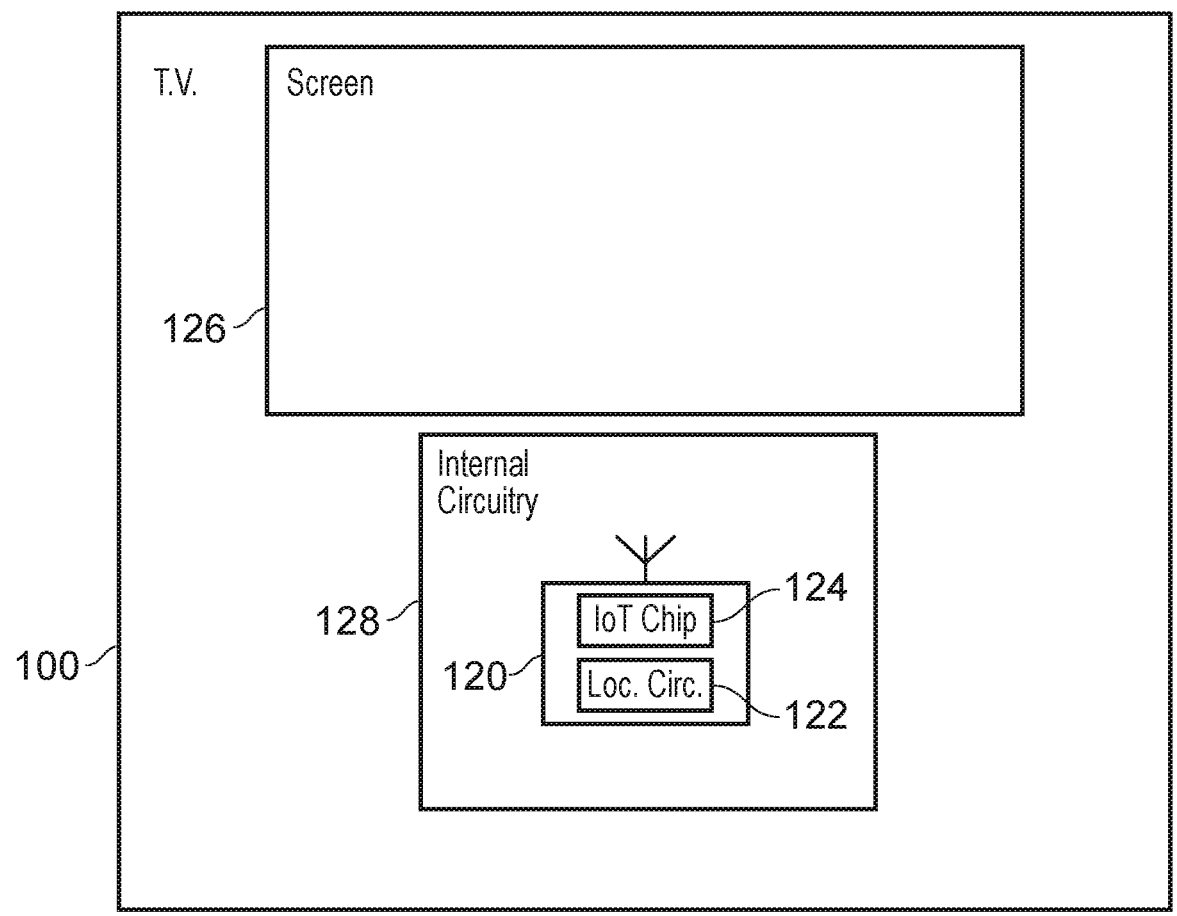
FIG. 1 is a schematic diagram illustrating an exemplary configuration of a recyclable product comprising a communications device to which the present technique may be applied.

FIG. 1 is an example of a recyclable product according to an example embodiment. FIG. 1 illustrates a recyclable product 100 comprising an Internet-of-Things (IoT) device 120. In the Example of FIG. 1, the recyclable product is a television (T.V.) 100. The TV typically comprises a screen 126 and internal circuitry 128 associated with the operation of the TV. In accordance with an embodiment, the TV 100 comprises an IoT device 128. In particular, the TV 100 comprises an IoT device 120 embedded in the internal circuitry 128 of the TV 100. It will be appreciated that the recyclable product could be any product which is recyclable at least in part. The IoT device 120 comprises an IoT chip 124 and a location circuitry1 22 (Loc. Circ). The location circuitry 122 contains circuitry configured to track a location of the recyclable product 100. Specifically, the location circuitry 122 tracks a location the IoT device 120. It will be appreciated that the location circuitry 122 may be any circuitry with functionality capable of determining the location of the recyclable product 100/IoT device 120. Examples of the location circuitry 122 include, but are not limited to, a Global Navigation Satellite System (GNSS) chip, circuitry capable of determining the location of the recyclable product 100/IoT device 120 by triangulation using infrastructure equipment in a network, circuitry capable of determining the location of the recyclable product 100/IoT device 120 by geolocation using a satellite. The IoT chip contains a transmitter, a receiver and controller circuitry configured to allow communication between the recyclable product and a wireless communications network. The communications device 120 may also comprise a data store (not shown) which may store, for example, composition information regarding materials comprising the recyclable product. As an example, the composition information may provide information on the material properties of the internal circuitry of the TV or the TV screen. The composition information may include the mass of the screen, types and proportions of materials present in the screen, an indication of which materials are recyclable, and/or an indication of a commercial value of the materials present in the screen. The data store may also contain recycling instructions. The recycling instructions may comprise information regarding disassembly of the TV. For example, the recycling instructions may indicate which recycling processes are optimal for recycling the TV with regard to environmental impact or with regard to minimising waste products associated with the recycling processes or with regard to minimising energy consumption, water consumption or other resource, such as acids, needed for the recycling process or potential pollution, for example of air or water caused by the recycling process. In some embodiments (see FIG. 11 below), a manufacturer of the recyclable product may transmit updated instructions for disassembly including updated recycling instructions to the tracking device or to a server. The server may be able to be accessed by a user of the tracking device or a person authorised by the user using another computing device. The recycling instructions may include instructions related to new recycling processes which may not have been available at a time of purchase of the recyclable product.

For the example shown in FIG. 1, a separate location chip 122 is provided to generate information representing an estimate of a location of the recyclable product 120. However in other examples, the IoT chip 124 may include circuitry for generating an estimate of the location of the recyclable product 120. Indeed, in other examples, the IoT chip 124 may use techniques for estimating its location based on signals received or transmitted via a wireless access interface used by the IoT chip 124 to communicate with a wireless communications network. For example, this might be Observed Time Difference of Arrival (OTDOA) techniques measuring a time difference of signals receive from different base stations or U-TDOA techniques, measuring a time difference of arrival of a pilot signal transmitted by and communications device.

The IoT device 120 may be embedded into the recyclable product as in the Example of FIG. 1. Alternatively, the IoT device 120 may be fastened (not shown) onto the recyclable product. In some embodiments, the fastening/embedding of the IoT device 120 onto/into the recyclable product may occur during manufacture by a manufacturer of the recyclable product. In other embodiments, the fastening/embedding of the IoT device 120 onto/into the recyclable product may occur after manufacture and by a user of the recyclable product.

The IoT device 120 is an example of a communications device. In some embodiments, the recyclable product 100 may comprise one or more communications devices.

Figure 2:
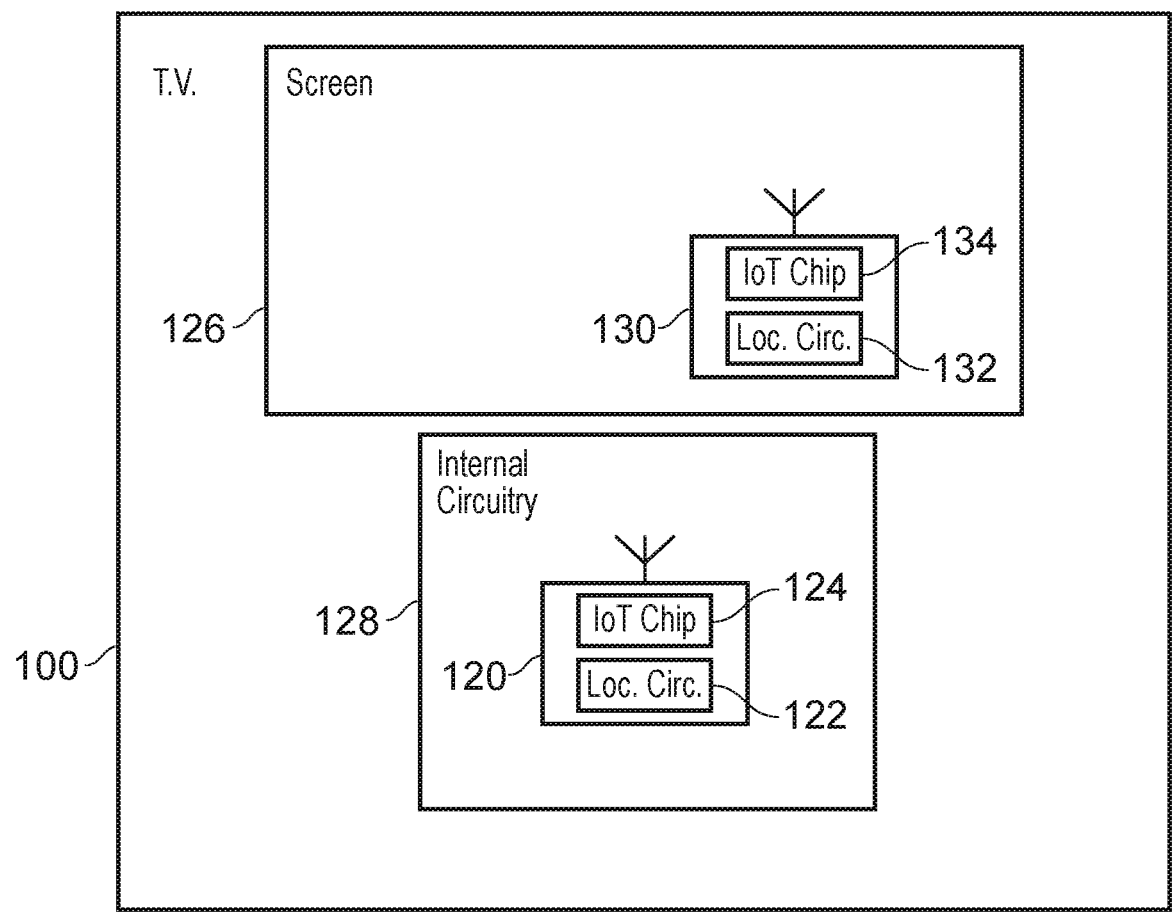
FIG. 2 is a schematic diagram illustrating an exemplary configuration of a recyclable product comprising more than one communications device to which the present technique may be applied.

FIG. 2 is an example embodiment of a recyclable product comprising more than one communications device. Referring to FIG. 2, the TV 100 comprises two communications devices 120, 130. The TV 100 may be comprised of multiple sub-assemblies and each of the sub-assemblies may have an associated communications device. In the example, a first sub-assembly is the screen 126 of the TV 100 and a second sub-assembly is the internal circuitry 128 of the TV 100. A first communications device 120 (the first communications device corresponds to the communications device 120 embedded in the TV of FIG. 1) is associated with the first sub-assembly and the second communications device 130 is associated with the second sub-assembly 126. The first communications device comprises a first IoT chip 124 and a first location circuitry 122. The second communications device comprises a second IoT chip 134 and a second location circuitry 132. Each of the IoT chips 124,134 contains transmitter circuitry, receiver circuitry and controller circuitry configured to provide wireless communications to and from the IoT chips attached to the recyclable product and a wireless communications network. Each of the location circuitry 122, 132 is circuitry configured to track the location of the recyclable product 200. In this embodiment, the first location circuitry 122 tracks a location of the first sub-assembly and the second location circuitry 132 tracks a location of the second sub-assembly. Similarly, the first IoT chip 124 communicates location information about the first sub assembly and the second IoT chip 134 communicates location information about the second sub-assembly. In an other embodiments (not shown), the first communications device 120 and the second communications device 130 may not both have an IoT chip and a location circuitry. As an example the first communications device may have the first IoT chip 120 and the first location circuitry 122 and the second communications device 130 may have the second location circuitry 132 but does not have the second IoT chip 134. In this example, the first communications device 120 may communicate location information about the second communications device obtained from the second location circuitry 132. As an alternative example, the first communications device 120 may have the first IoT chip 120 and the first location circuitry 122 and the second communications device 130 may have the second IoT chip but does not have the second location circuitry 132. In this example, the second communications device may determine the location of the second communications device 130 by means not requiring location circuitry. For example, the second communications device 130 may determine the location of the second communications device 130 based on an identification of a cell of an infrastructure equipment to which the second communications device 130 is connected. Other means of determining the location of the second communications device 130 not explicitly mentioned here will be appreciated by the skilled person.

Figure 3:
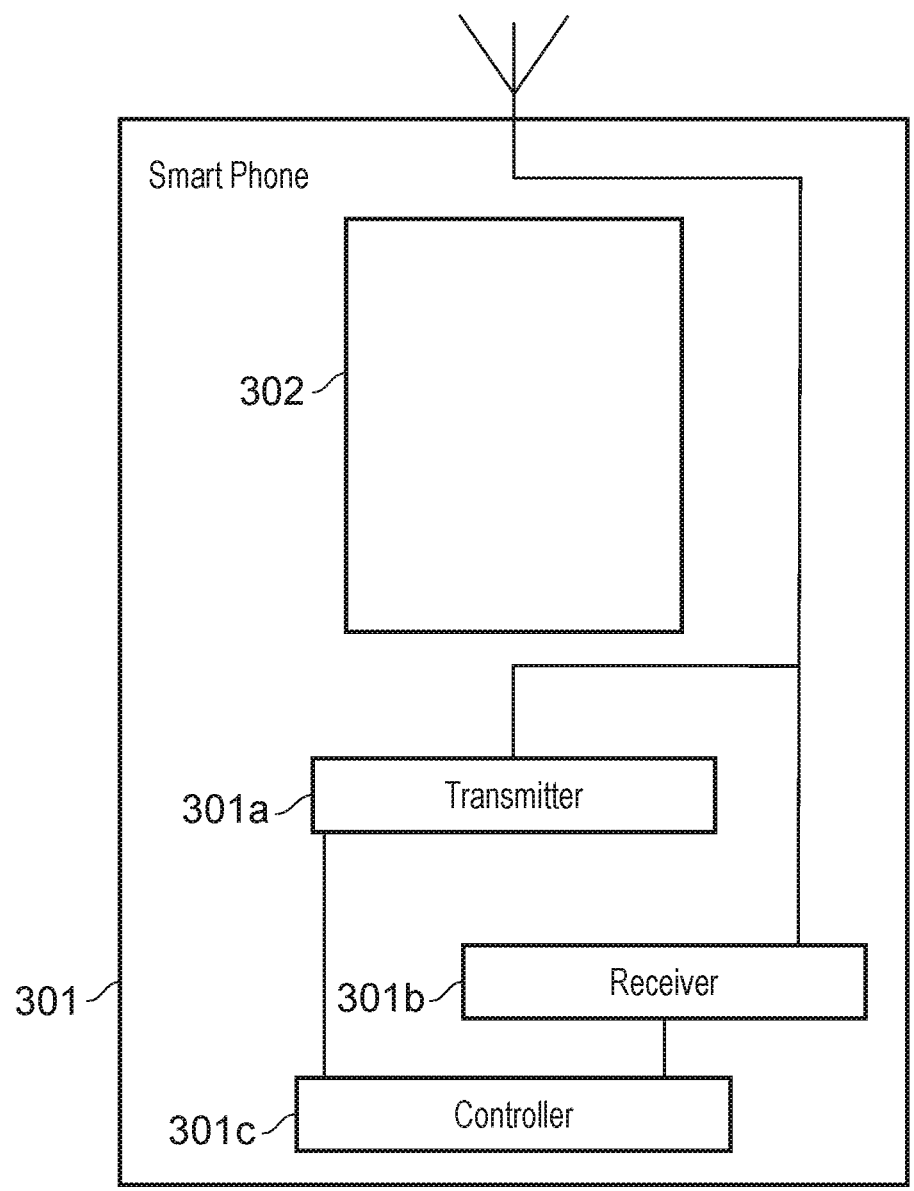
FIG. 3 is a schematic diagram illustrating an exemplary configuration of tracking device to which the present technique may be applied.

FIG. 3 illustrates an exemplary configuration of a tracking device according to an example embodiment. For the example shown in FIG. 3, the tracking device 301 is a smart phone which may be owned by a user. The tracking device 301 comprises a transmitter 301a, a receiver 301b and a controller 301c configured for communication. In the example of FIG. 3, the tracking device comprises a display screen 302. It will be appreciated that the tracking device 301 may be a device other than a smart phone. As alternative examples, the tracking device 301 may be a personal computer, a tablet or a laptop. In some embodiments, the tracking device 301 is operated by a user who wishes to recycle a recyclable product. The tracking device 301 comprises software (not shown) including an application which may be used to communicate with one or more communications devices of the recyclable product, one or more recycling entities or a manufacturer of the recyclable product. The tracking device may also store, in a data store (not shown), recycling instructions including information regarding instructions for the disassembly of the recyclable product. The tracking device 301 may also store, in the data store, composition information regarding the materials of the recyclable product.

Figure 4:
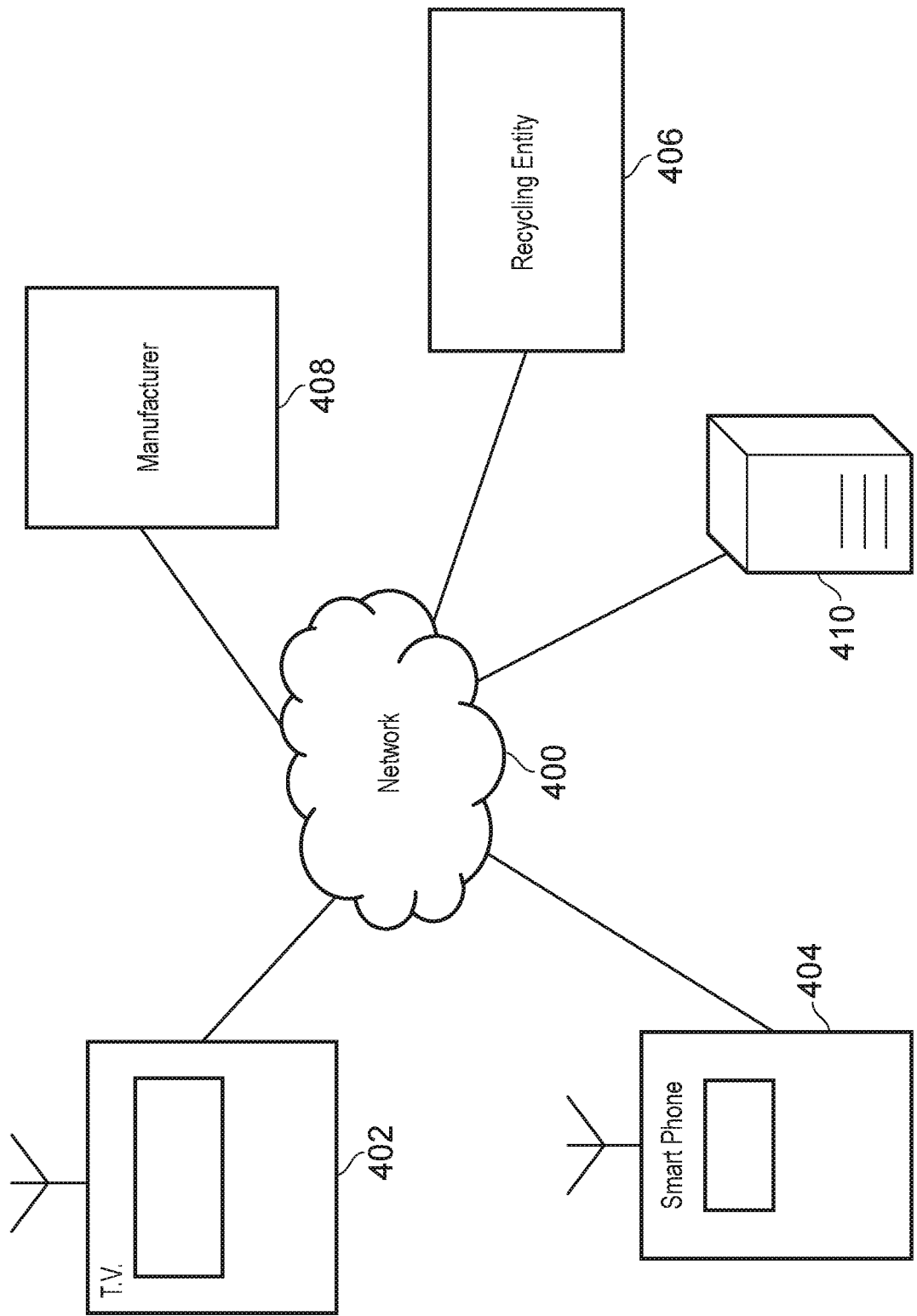
FIG. 4 is a schematic diagram illustrating an exemplary configuration of a wireless communications network to which the present technique may be applied.

FIG. 4 illustrates an example embodiment in which communications of a recyclable product, a tracking device, a recycling entity, a web server, a data server and a manufacturer is provided via a network. A recyclable product 402 (such as TV 100), a tracking device 404 (such as smart phone 301), a recycling entity 406, a server 410 and a manufacturer 408 are connected via a network 400. The network is, for example, a network through which communication is performed using a communication protocol. For example, the network may use the communication protocol TCP/IP over the internet. The network 400 may be a secure network through which communication is performed using a communication protocol unique to the network 400. The network 400 is, for example, the Internet, an intranet, or a local area network. The coupling of the recyclable product, the tracking device, the manufacturer and the recycling entity may be, for example, via a wireless local area network (LAN) such as Wi-Fi. The recycling entity 406 may be a recycling company for example or some entity which may be interested in recycling the recyclable product. The manufacturer is a manufacturer of the recyclable product. In some embodiments, the recycling entity is the manufacturer of the recyclable product. The server 410 may be any server such as a web server or a data server. The server 410 may also represent combinations of servers as will be appreciated by the skilled person. For example, the server 410 may comprise a web server and a data server. The server 410 provides a user interface of the tracking device 404, a computing device of the recycling entity 407 and a computing device of the manufacturer 408. In particular, the server may provide a user interface for an application. The server 408 also stores information received by the server in a database. In one embodiment, the server may be a combination of a data server and a web server. In this embodiment, the web server provides the user interface for the application and the web server transmits information to the data server for storage.

Figure 5:
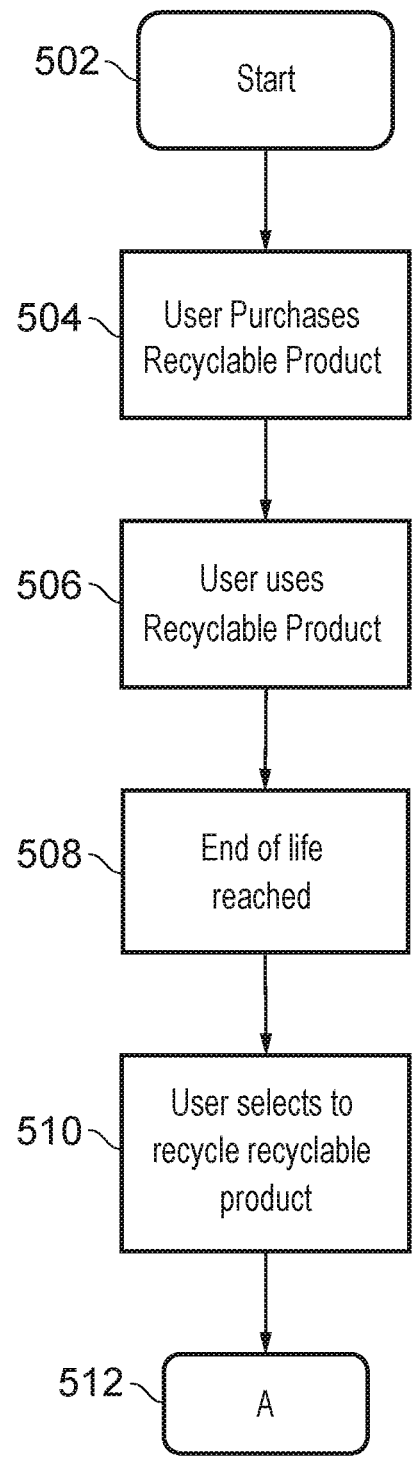
FIG. 5 is a flow diagram illustrating an example of how a recyclable product may reach an end of life point.

FIG. 5 is a flow diagram illustrating an exemplary procedure to which the present technique may be applied. After a start point 502, a user, such as a consumer, purchases a recyclable product 504. The user proceeds to use the recyclable product for a period of time 506. After the period of time, the user may decide that the recyclable product has reached an end of life point 508. The end of life point corresponds to a point in time at which the user decides that the recyclable product is to be recycled. This decision may be based on, for example, damage caused to the recyclable product during the period of time for which the user was using the recyclable product and/or a desire for the user to purchase a new product and/or obsolescence of software in the product or to which the product connects. After the end of life point has been reached, the user selects to recycle the recyclable product 510. The user may or may not be the owner of the recyclable product. The user may authorise another party via a network connected computer system to perform the selecting. The selecting to recycle the recyclable product may occur by the user logging into an Application on a smartphone owned by the user (the smartphone being an example of a tracking device) and selecting an option to recycle the recyclable product. The selecting of the option to recycle the recyclable product on the Application may trigger the smartphone to transmit an indication that the recyclable product is to be recycled to the recyclable product. Specifically, the indication that the recyclable product is to be recycled may be transmitted to one or more communications devices associated with the recyclable product. After the user selects to recycle the recyclable product, step A 512 is reached.

Figure 6:
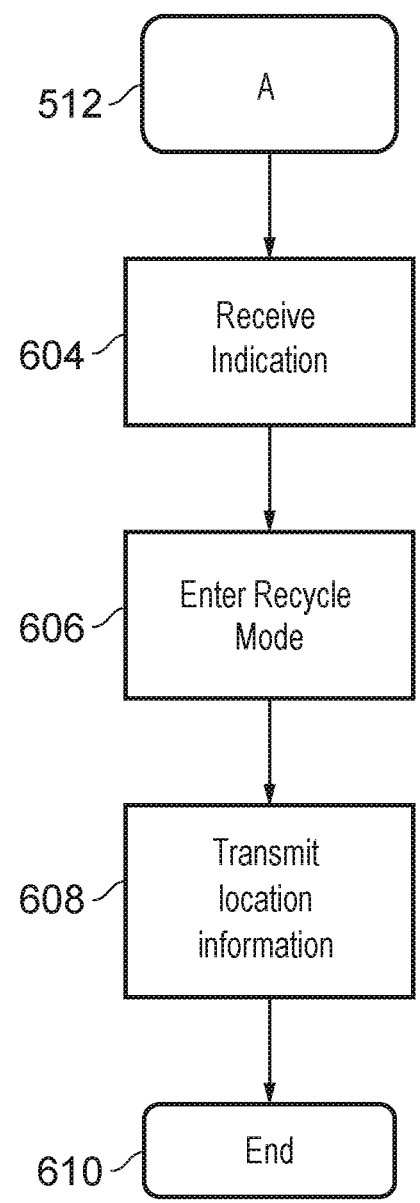
FIG. 6 is a flow diagram illustrating processes carried out by a communications device of a recyclable product according to an example embodiment.

FIG. 6 is a flow diagram illustrating the processes carried about by a recyclable product according to one embodiment. After step A 512 in FIG. 5, the recyclable product receives=, an indication that the recyclable product is to be recycled. In some embodiments, a tracking device, such as smartphone 301, transmits 604 the indication that the recyclable product is to be recycled to the recyclable product. For example, the indication that the recyclable product is to be recycled may be transmitted to the recyclable product using Wi-Fi, or Bluetooth or other wireless/wired communication technologies as will be appreciated by the skilled person. In other embodiments, the indication may be received by the recyclable product by means of a user, or a person authorised by the user, activating a physical switch the recyclable product. In some embodiments, the physical switch may be attached to or embedded in the recyclable product. The received indication causes a communications device of the recyclable product, such as IoT device 120, to enter a recycle mode 606. In other embodiments, the recyclable product may determine that it should enter the recyclable mode without receiving an indication from the smartphone or via a physical switch. For example, the recyclable product may determine to enter the recycle mode based on an expiry of a pre-determined time limit. In this embodiment, the communications device of the recyclable product may transmit an indication that it has entered the recycle mode to the tracking device or a server (such as server 410). It is therefore to be understood that references to the recyclable product entering the recycle mode in response to receiving the indication from the tracking device throughout this disclosure is an exemplary embodiment and any of the above means of enabling the recyclable product to enter the recycle mode could alternatively be used. In the recycle mode, the communications device of the recyclable product transmits 608 location information to the tracking device. The location information may include for example the location of the recyclable product in real time overlaid on a map in an application on the tracking device. In some embodiments, identification information identifying the recyclable product is transmitted with the location information. The recycle mode may be regarded as an "active" state of the communications device in which the communications device is transmitting at least location information. If the communications device is not in the recycle mode, then it may be in an "inactive" state which may correspond to a low power state of the communications device.

Figure 7:
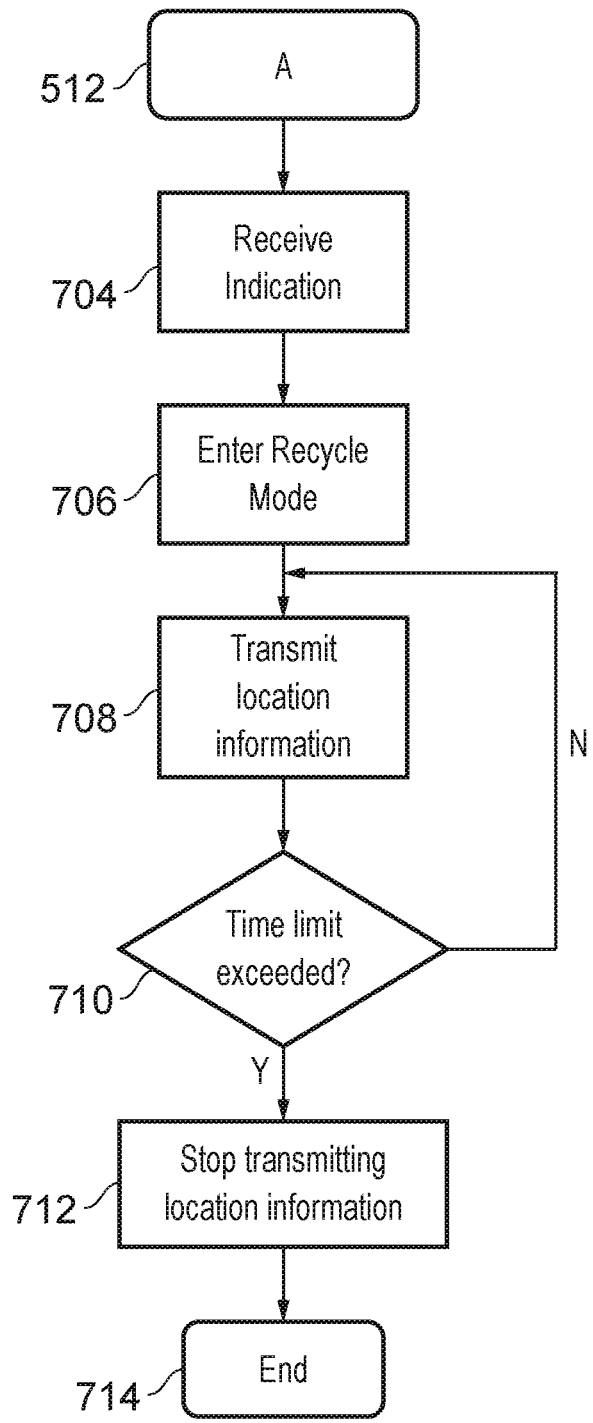
FIG. 7 is a flow diagram illustrating processes carried out by a communications device of a recyclable product according to an example embodiment.

FIG. 7 is a flow diagram illustrating processes carried out by a recyclable product according to an alternative embodiment. In this embodiment, a communications device of the recyclable product, such as IoT device 120, receives from a tracking device, such as smartphone 301, an indication that the recyclable product is to be recycled 704. The received indication causes the communications device of recyclable product to enter a recycle mode 706. In the recycle mode, the communications device of the recyclable product transmits location information to the tracking device 708. In this embodiment, the communications device of the recyclable product is configured with a pre-determined time limit. As illustrated in FIG. 7, the communications device determines whether the time limit has been exceeded 710. If the time limit has been exceeded, then the communications device stops transmitting location information 712. If the time limit is not exceeded, the communications device will continue to transmit location information of the recyclable product to the tracking device 708. In other words, the communications device transmits location information of the recyclable product for a pre-determined period of time. In some embodiments, transmission of location information may be determined by the duration and the availability of its power supply. In some embodiments, the communications device is released of its configuration of reporting the location information.

Figure 8:
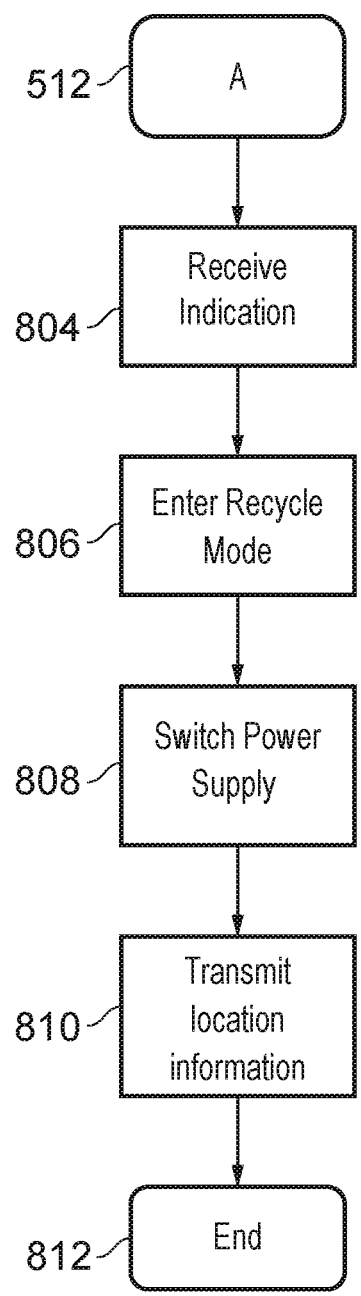
FIG. 8 is a flow diagram illustrating processes carried out by a communications device of a recyclable product according to an example embodiment.

FIG. 8 is a flow diagram illustrating processes carried out by a recyclable product according to an alternative embodiment. In this embodiment, after step A 512, a communications device of the recyclable product receives, such as IoT device 120, receives from a tracking device, such as smartphone 301, an indication that the recyclable product is to be recycled 804. The received indication causes the communications device of the recyclable product to enter a recycle mode 806. The communications device of the recyclable product then switches power supply 808. The switching of a power supply will now be explained with reference to FIGS. 9A and 9B.

Figure 9A:
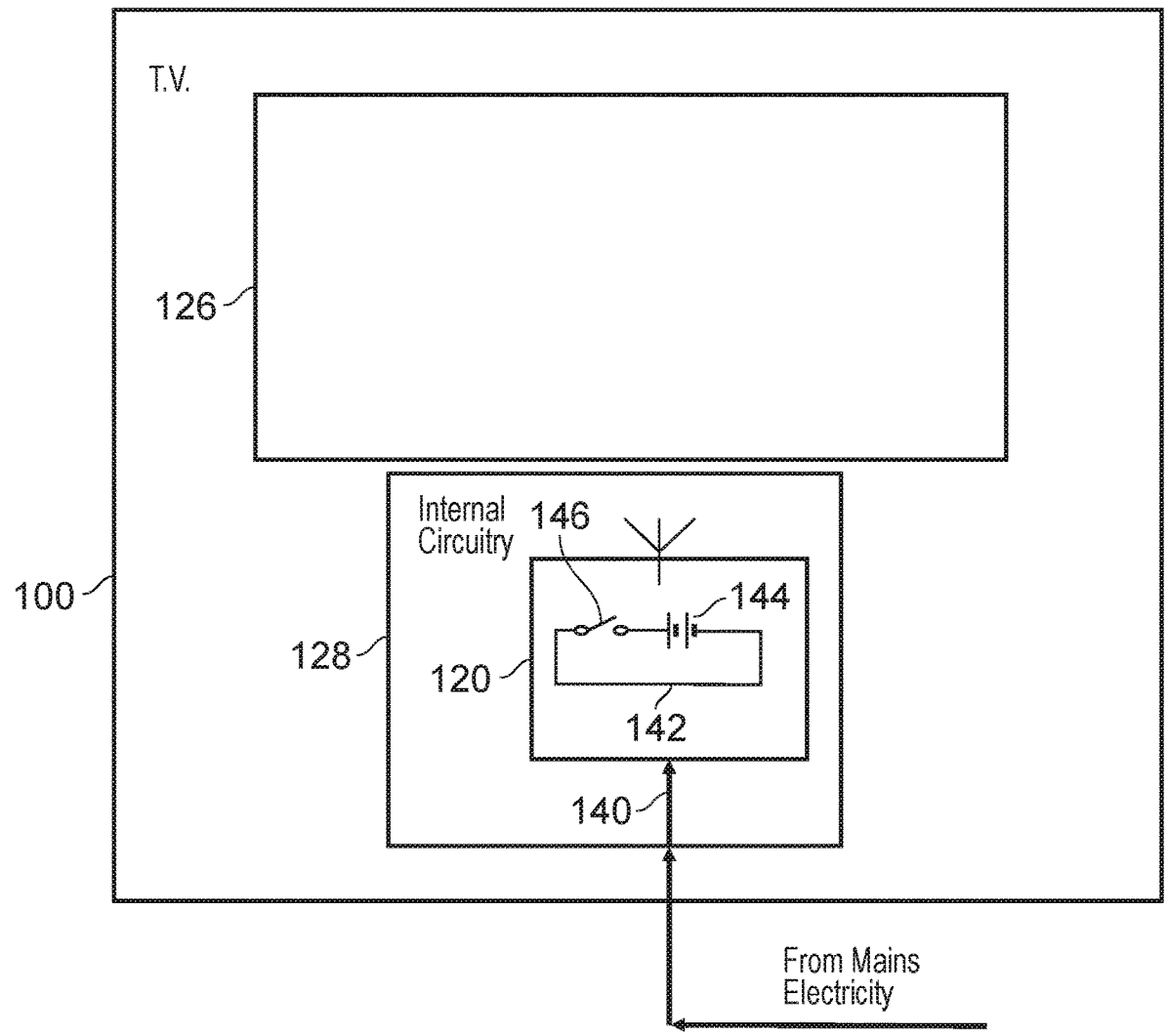
FIG. 9A is schematic diagram illustrating an exemplary configuration of a communications device of a recyclable product being powered by the power supply of the recyclable product.

FIG. 9A illustrates a TV, such as the TV 100 in FIG. 1, comprising a communications device 120. The communications device corresponds the communications device 120 of FIG. 1. The IoT chip and location circuitry are not shown for clarity but are presumed to be present in this example. The communications device comprises a circuit 142 configured for providing power to the communications device. In FIG. 9A, the switch 146 of the circuit is in the open position. Accordingly, in FIG. 9A, the battery 144 of the internal circuit 142 does not provide power to the communications device 120 in this example. The internal circuitry 128 of the TV 100 is powered by a mains electricity power supply 140.

In this example, the communications device is also connected to the mains electricity 140 via the TV 100. Accordingly, the mains electricity 140 provides power to the communications device 120.

Figure 9B:
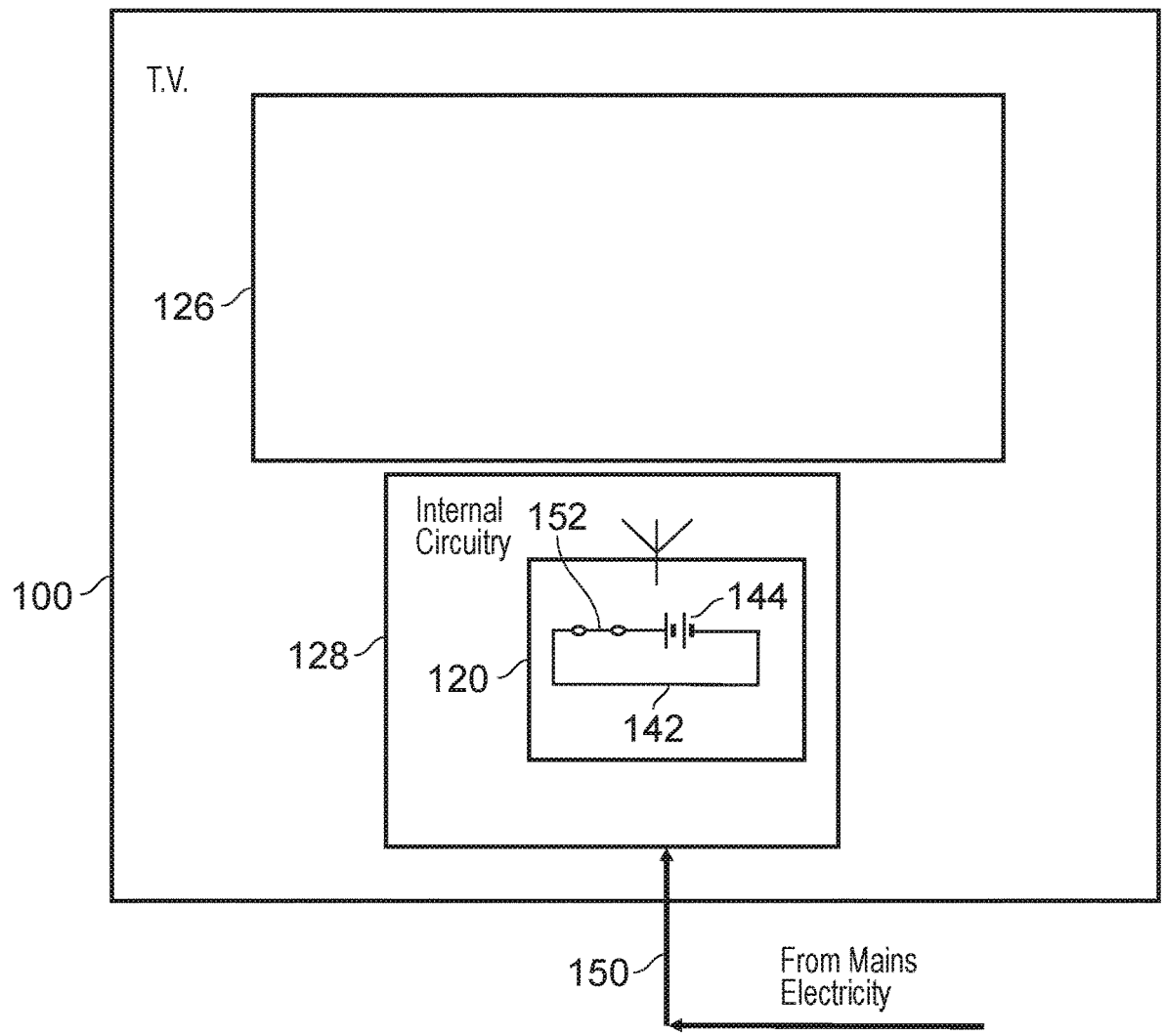
FIG. 9B is schematic diagram illustrating an exemplary configuration of a communications device of a recyclable product being powered by an independent power supply.

FIG. 9B illustrates the TV 100 of FIG. 9A after the switching of power supply has been triggered (as in step 808 of FIG. 8). The mains electricity 150 continues to power the internal circuitry of the TV 100 but does not power the communications device 120. The switch 152 of the circuit 128 configured to provide power to the communications device 120 is in the closed position. Accordingly, the battery 144 provides power to the communications device. In this embodiment, the battery 144 may be regarded as an internal power supply of the communications device 120. The battery 144 may be a lithium battery in an example. The battery 144 may be a coin cell in an example. In other embodiments, the switch 152 may be outside or attached to the recyclable product 100 or communications device 120. The switch 152 may be powered by a power source (not shown) other than the battery 144. The switch 152 may be able to be operated manually by a user or a person authorised by a user. In other embodiments, the communications device may be powered by a bringing an inductive device close to the communications device 120. In some embodiments, the recyclable product may send an indication that the communications device 120 should switch to the independent power supply to a server (such as server 410). In this example, the user of the tracking device may access the indication that the communications device should switch to the independent power supply. Alternatively, a person authorised by the user may access the indication using a computing device other than the tracking device. The indication may prompt the user to switch the power supply manually or using an inductive device as mentioned above.

In an alternative embodiment, the communications device may receive power only from the independent power supply and not from the power supply of the recyclable product. However, the switching to an independent power supply after the communications device enters the recycle mode is preferred in order to minimise the amount of time for which the communications device relies on the independent power supply. For example, if the communications device only receives power from an independent power supply such as a lithium battery, the life of the lithium battery may expire before the recycle mode has been activated. Returning to FIG. 8, after switching power supply, the recyclable product transmits location information to the tracking device 810.

It will be appreciated that the internal power supply of the communications device may not be a battery but may be an alternative internal power supply, such as an induction coil.

It will also be appreciated that the above embodiments can be combined in a variety of ways. The above embodiments could be applied to a case in which a recyclable product has more than one communications device, such as IoT device 120 and 130. For example, one embodiment comprises more than one communications device with a pre-determined time limit and more than one communications device which switches power supply when entering the recycle mode. In embodiments the communications device may be conditionally instructed to stop transmitting or to turn itself off. In some embodiments, the communications device may not transmit location information continuously when in the recycle mode. In this embodiment, the communications device may transmit the location information in configurable time slots for specified durations to reduce power consumption. In some embodiments, with more than one communications device, the communications devices may communicate with each other.

Figure 10:
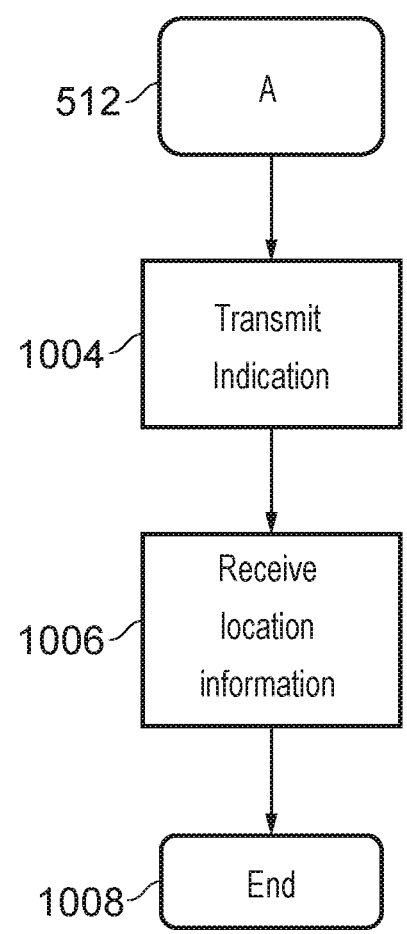
FIG. 10 is a flow diagram illustrating processes carried out by a tracking device according to an example embodiment.

FIG. 10 is a flow diagram illustrating processes carried out by a tracking device according to an embodiment. After step A 512, the tracking device transmits an indication to a communications device associated with the recyclable product that the recyclable product is to be recycled 1004. The tracking device then receives location information of the recyclable product from the communications device 1006. Specifically, the tracking device receives location information of the communications device of the recycling product. In some embodiments, the tracking device may also receive composition information with the location information. The composition information may include information regarding the materials of the recyclable product. In some embodiments where multiple communications devices are associated with multiple sub-assemblies (such as the example shown in FIG. 2), the composition information received from each communications device may only provide composition information regarding the sub-assembly associated with that communications device.

Figure 11:
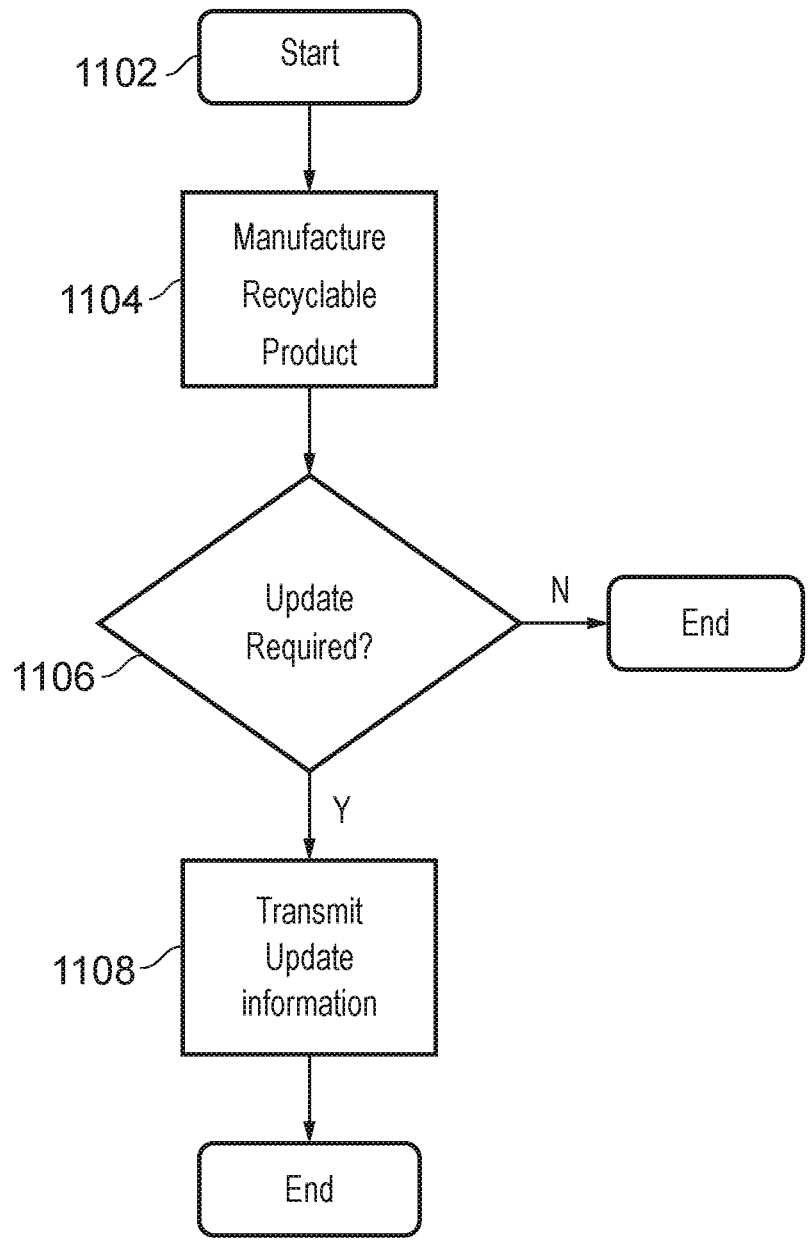
FIG. 11 is a flow diagram illustrating processes carried out by a manufacturer according to an example embodiment.

FIG. 11 is a flow diagram illustrating processes carried out by a manufacturer according to an embodiment. The manufacturer manufactures the recyclable product 1104. The manufacturer may embed a communications device in the recyclable product. Alternatively, the manufacturer may fasten the communications device to the recyclable product. The manufacture may store instructions for how to disassemble the recyclable product in a data store of the at least one communications device. The manufacturer may also store composition information in the data store of the communications device. The composition information may include information regarding the materials of the recyclable product. The manufacturer determines whether updated composition information or updated instructions for disassembly of the recyclable product are required 1106. The updated instructions for disassembly may include recycling instructions. The recycling instructions may include instructions related to new recycling processes which may not have been available at the time of purchase 504 of the recyclable product. If required, the manufacturer transmits update information to the tracking device 1108. The update information may contain updated composition information and/or updated instructions for how to disassemble the recyclable product. Alternatively, the manufacture may transmit the update information directly to the communications device.

Figure 12:
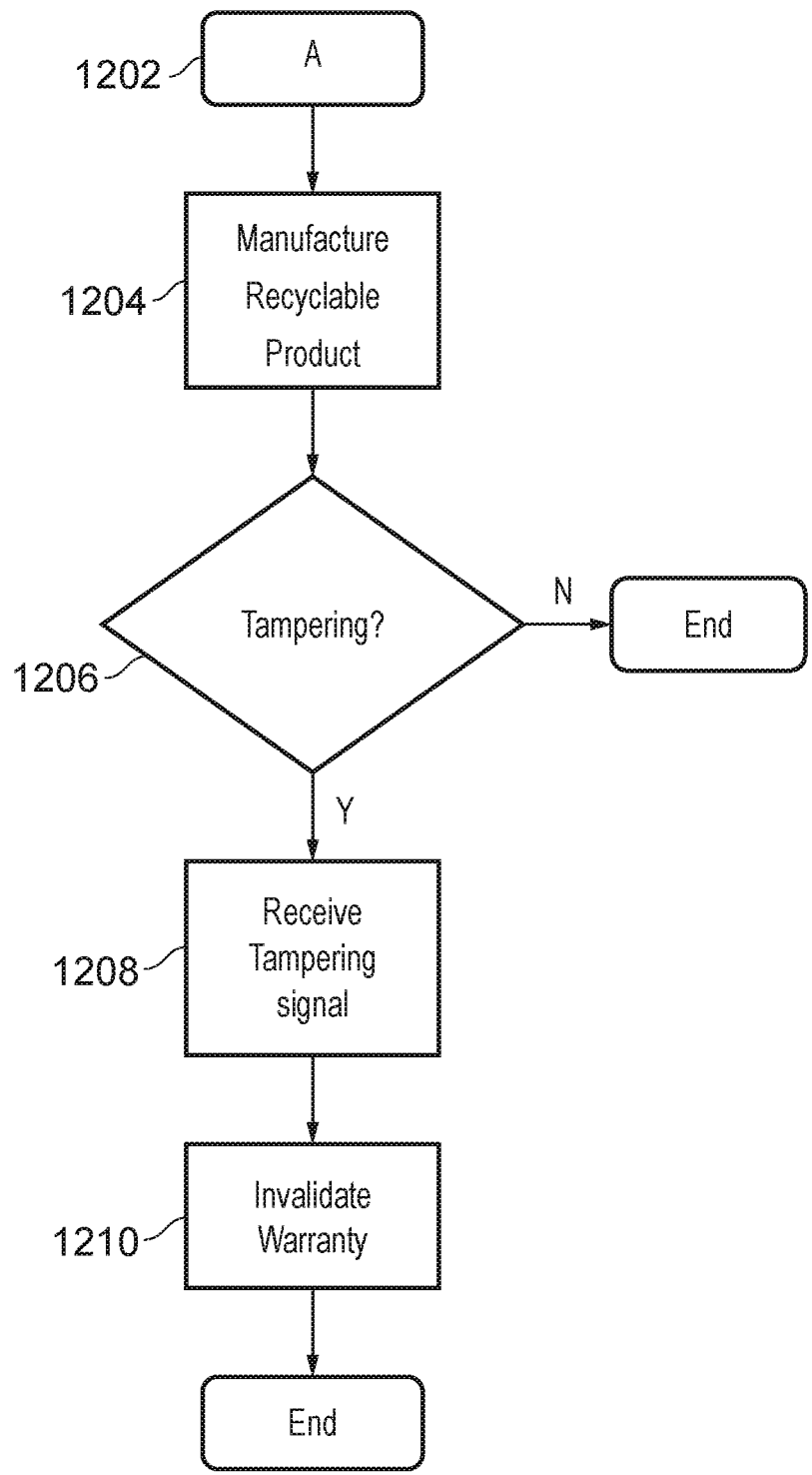
FIG. 12 is a flow diagram illustrating processes carried out by a manufacturer according to an example embodiment.

FIG. 12 is a flow diagram illustrating processes carried out by a manufacturer according to an embodiment. The manufacturer manufactures the recyclable product 1204. The manufacture may embed a communications device in the recyclable product. Alternatively, the manufacturer may fasten the communications device to the recyclable product. The manufacturer may manufacture the recycling product in such a way that the manufacturer can detect tampering by a third party. In this embodiment, the manufacturer determines whether the communications device has been tampered with 1206. If a user removes or attempts to remove the communications device of the recyclable product, the communications device transmits a signal to the manufacturer 1208 or another party, optionally invalidating a warranty 1210. The removal of the communications device may undermine obligations on behalf of the manufacturer, retailer or other party to recycle or take back the recyclable product. It may be that those obligations result in the manufacturer, retailer or other party being subject to statutory fines or penalties. In alternative embodiments, the communications device may be fastened in such a way that removal or attempted removal of the communications device hinders functionality of the recyclable product or detrimentally affects the aesthetics of the recyclable product.

Figure 13:
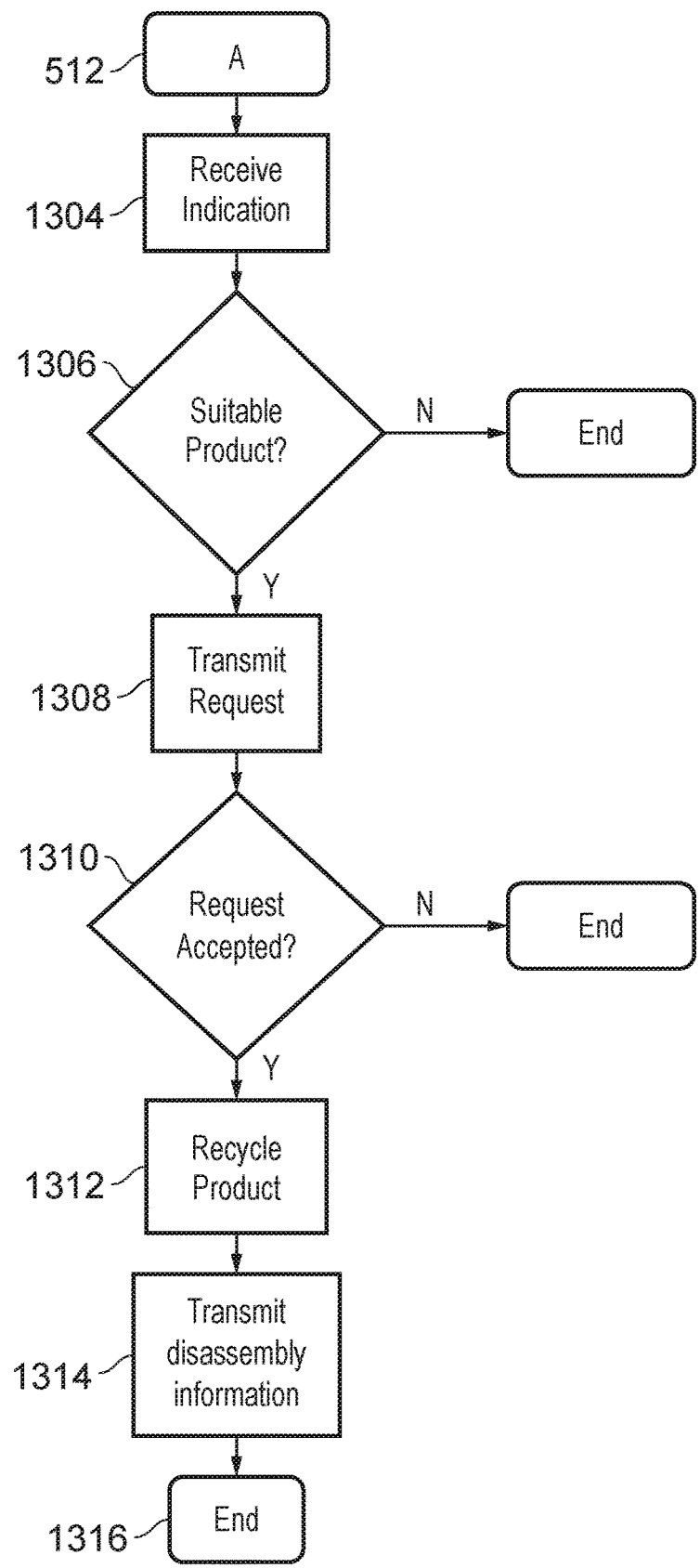
FIG. 13 is a flow diagram illustrating processes carried out by a recycling entity according to an example embodiment.

FIG. 13 is a flow diagram illustrating processes carried out by a recycling entity according to an embodiment. The recycling entity receives an indication from the tracking device that the recyclable product is to be recycled 1304. A user of the tracking device may transmit this indication using an application on the tracking device. In an alternative embodiment, the user of the tracking device may store the indication in a database which can be accessed by the recycling entity. In this embodiment, the recycling entity accesses the database containing the indication. The recycling entity then determines whether the recyclable product is suitable to be recycled by the recycling entity 1306. In one embodiment, the tracking device may transmit composition information and/or instructions for disassembly to the recycling entity. The determination whether the recyclable product is suitable to be recycled by the recycling entity may be based on the composition and/or instructions for disassembly. As an example, the recycling entity may prefer to recycle specific materials or may prefer to use specific disassembly procedures. If the recycling entity determines that the recyclable product is suitable to be recycled by the recycling entity then the recycling entity transmits request information to the tracking device 1308. The request information may include a request to recycle the recyclable product and/or a bid including a compensation offer to the user of the tracking device. In some embodiments, the user may not own the recyclable product. In this embodiment, the compensation offer may be made to the owner of the recyclable product. In other embodiments, a compensation offer is made to both the user of the tracking device and the owner of the recyclable product. The user of the tracking device then determines whether to accept the request information 1310. The determination whether to accept the request information may be based on the compensation offer. If the user of the tracking device accepts the request information then the recycling entity recycles the recyclable product 1312. The recycling entity and the user of the tracking device may arrange for collection of the recyclable product by the recycling entity as an example. This arrangement may occur via the application of the tracking device. As an alternative example, the user may send the recyclable product to the recycling entity or bring it to a recycling point from which it is collected by or otherwise conveyed to the recycling entity. After the recycling entity has recycled the recyclable product, the recycling entity transmits disassembly information to the tracking device 1314. The disassembly information may include information regarding the disassembly of the recyclable product. For example, the disassembly information may include information regarding the amount of each material of the recyclable product recycled and a number of communications devices associated with the recyclable product, which were not destroyed during the recycling procedure.

Figure 14:
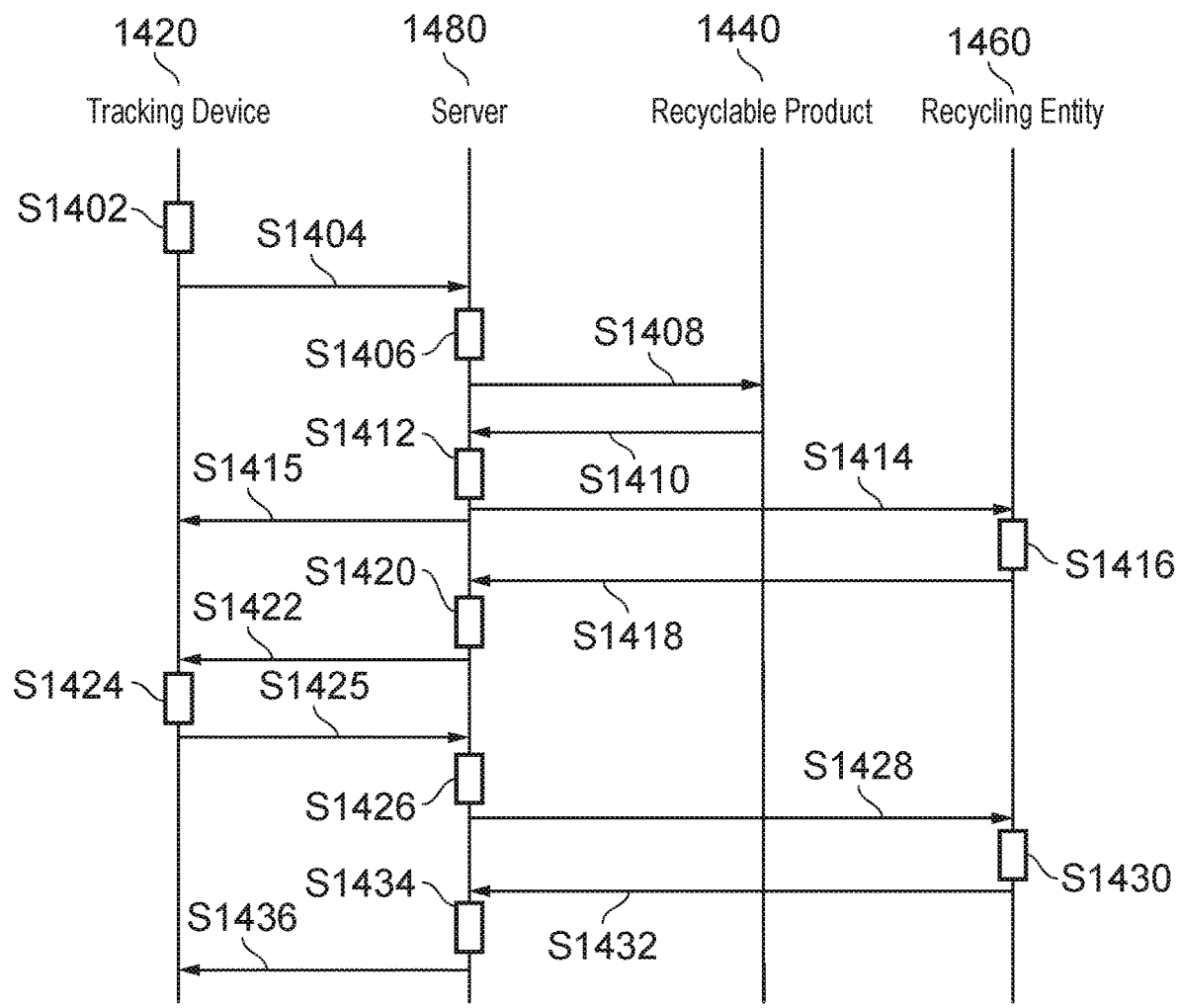
FIG. 14 illustrates a processing procedure at the end of life of a recyclable product according to an example embodiment.

FIG. 14 illustrates an example of a processing procedure at the end of life of a recyclable product according to one embodiment. A user of a tracking device 1420 determines that a recyclable product 1440 is to be recycled and selects, via an application provided by a server 1480 for example, that the recyclable product should be recycled (step S1402). The tracking device 1420 transmits an indication to the server 1480 that the selected recyclable product 1440 is to be recycled (step S1404). The server 1480 then stores the indication that the recyclable product 1440 is to be recycled in a database (step S1406). The indication may include an identity of the recyclable product 1440 to be recycled and a time at which the indication was transmitted. The server then transmits the indication that the recyclable product is to be recycled to the recyclable product (step S1408). In response, the recyclable product transmits location information to the server (step S1410). The server stores the location information of the recyclable product (step S1412). The server 1480 then transmits the indication that the recyclable product is to be recycled to a recycling entity 1460 (step S1414). This may occur, for example, if the recycling entity 1460 uses a computing device to access the application provided by the server and the server retrieves the indication that the recyclable product is to be recycled from the database in the server. The server also transmits the location information to the tracking device (step S1415). The recycling entity then determines, from the database for example, whether the recyclable product is suitable for recycling by the recycling entity (step S1416). If it is determined that the recyclable product is suitable (see FIG. 15) for recycling by the recycling entity then the recycling entity transmits request information to the server (step S1418). This may occur, for example, if the recycling entity uses a computing device and sends the request information via the application. The request information may include a request to recycle the recyclable product and/or a bid to provide compensation to the user of the tracking device. The server stores the request information (step S1420) and transmits the request information onto the tracking device (step S1422). The user of the tracking device then determines whether to accept the request information (S1424). The user may be presented with multiple bids from multiple recycling entities (now shown in FIG. 14) via the application, all of whom have transmitted a request to recycle the recyclable product to the user. If the user accepts the request information from the recycling entity 1460, via the application for example, then tracking device sends an approval to the server (step S1425). The server stores the approval (step S1426) and transmits the approval to the recycling entity (step S1428). The recycling entity then recycles the recyclable product (step S1430). The recycling entity then transmits to the server, via the application for example, disassembly information regarding the recyclable product (step S1432). The server stores the disassembly information (step 51434) and transmits the disassembly information to the tracking device (step S1436). During the recycling process, one or more communication devices present in the recyclable product (such as communication devices 120, 130) may be recycled. In some embodiments, the one or more communications devices are sent back to a manufacturer of the recyclable product based on, for example, an agreement between the manufacturer and the recycling entity. In some embodiments, IoT chips in the communications devices (such as IoT chips 124, 134) are sent back to the manufacturer. The manufacturer may embed the recycled communications devices or IoT chips into new recyclable products. In some embodiments, the recycling entity embeds the communications devices or IoT chips into new recyclable products. It will be appreciated that FIG. 14 represents an exemplary embodiment. Alternative embodiments may not provide a In some embodiments, as mentioned above in step S1418 (or 1306), the recycling entity (or multiple recycling entities) may determine if the recyclable product is suitable to be recycled by the recycling entity. A server (such as server 410 in FIG. 14) may provide a list of recyclable products belonging to various users which have entered the recycle mode to the recycling entity.

Figure 15:
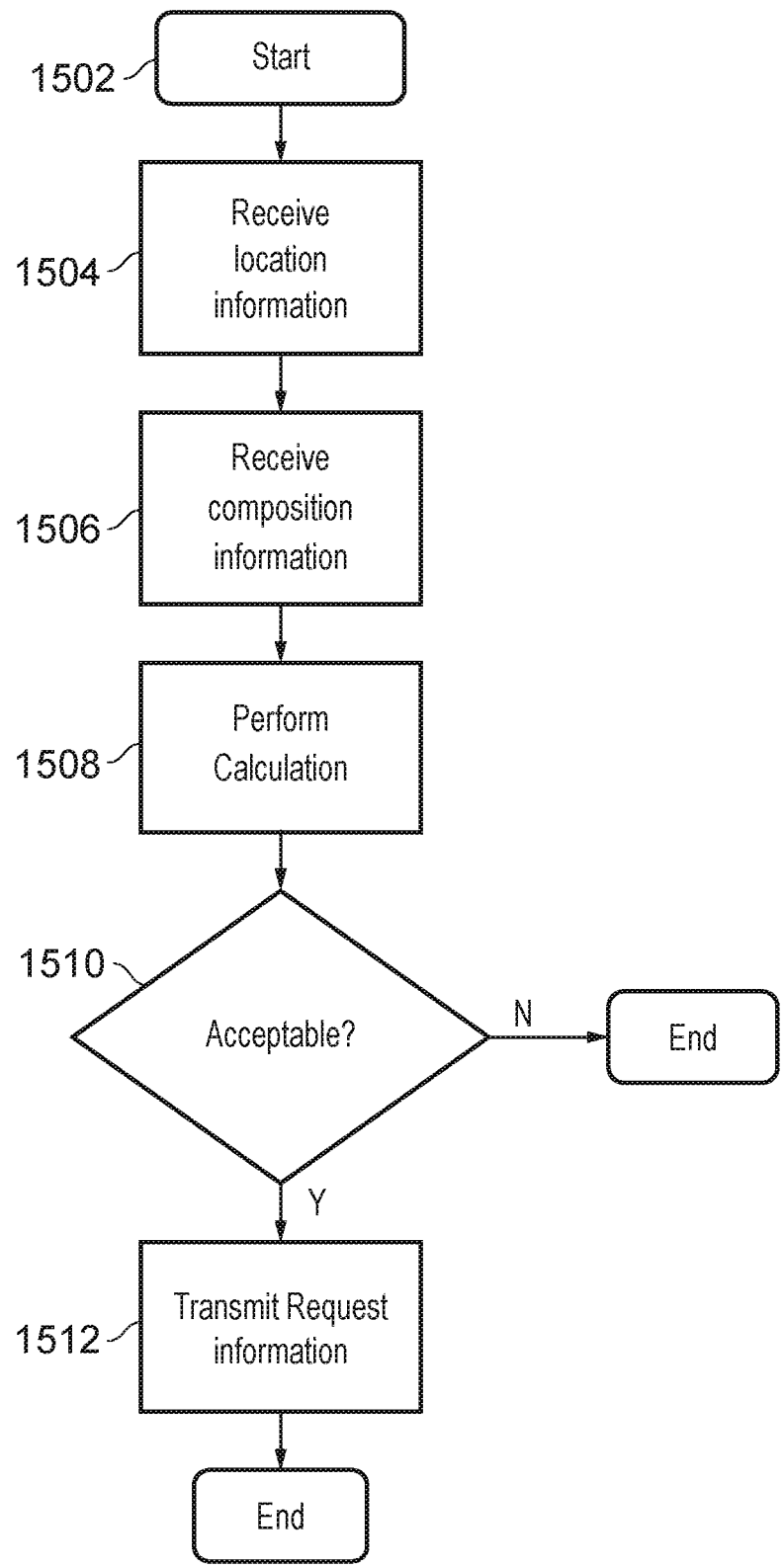
FIG. 15 is a flow diagram illustrating processes carried out by a recycling entity to determine if a recyclable product is suitable to recycled by the recycling entity according to an example embodiment.

FIG. 15 illustrates a processing procedure which may be implemented by a recycling entity in order to determine if each recyclable product in a list of recyclable products provided by the server is suitable to be recycled by the recycling entity. The recycling entity receives 1504 location information of the recyclable product. The location information may be transmitted to the recycling entity by the server. The location information may be received by the recycling entity together with identification information identifying the recyclable product. The recycling entity may receive 1506 composition information regarding materials comprising the recyclable product. In some embodiments, the recycling entity uses the identification information to obtain composition information regarding the materials comprising the recyclable product. The recycling entity then calculates 1508 a request parameter on a basis of at least one of recycling processes available to the recycling entity, the composition information regarding the materials comprising the recyclable product, and the location information of the recyclable product. The recycling entity then determines 1510, on a basis of the request parameter, whether to transmit request information including a request to recycle the recyclable product to the server. If it is determined that the request parameter is acceptable, the recycling entity transmits 1512 the request information to the server. If it is determined that the request parameter is not acceptable, the recycling entity does not transmit the request information to the server. The request parameter may be an estimate of an amount of the identified materials comprising the recyclable product obtained by a recycling process to be used to recycle the recyclable product. For example, the recycling entity may send the request information if an estimated amount of the materials comprising the recyclable product is above a pre-determined threshold. The request parameter may be an estimated cost to travel to the location of the recyclable product. The request parameter may be an updated value of the materials comprising the recyclable product. The request parameter may be a number of recyclable products belonging to the recycling entity to undergo a same recycling process. The request information may include a request to recycle the recyclable product conditional on the user providing a pre-determined number of recyclable products to undergo the same recycling process.

Figure 16:
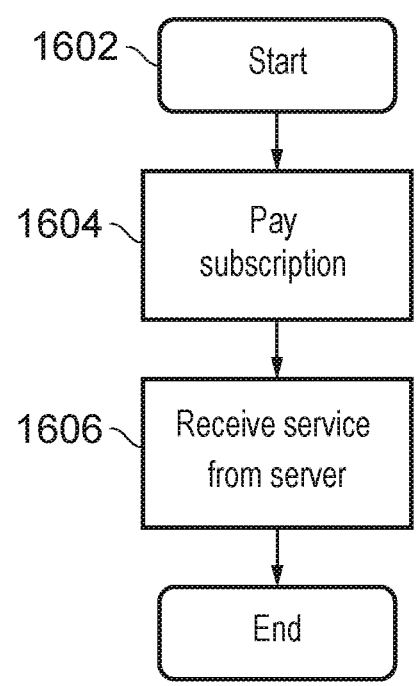
FIG. 16 is a flow diagram illustrating how a recycling entity may enter into a subscription for a service provided by a manufacturer.

In other embodiments, as illustrated in FIG. 16, one or more recycling entities may pay subscriptions 1604 to a service administrated 1606 from a server (such as server 410) that provides them with identification and location information of a list of recyclable products in the recycle mode. The subscription may be paid in whole or in part to the manufacturer or a licensor of the communications devices or a party authorised by the manufacturer. The subscription may involve, in whole or in part, a per unit fee for recyclable products.

Figure 17:
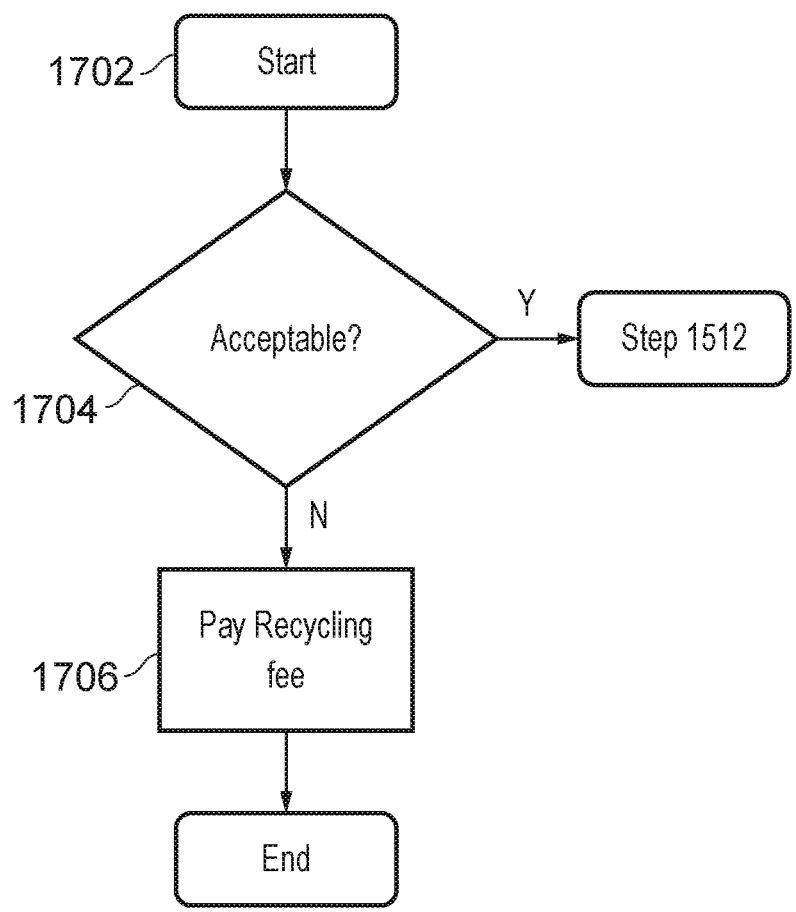
FIG. 17 is a flow diagram illustrating a process by which a manufacturer may pay a recycling entity a recycling fee.

In some embodiments, as illustrated in FIG. 17, a recycling entity determines whether a request parameter is acceptable 1704. If it is determined that the request parameter is acceptable, then processing proceeds to step 1512. If it is determined that the request parameter is unacceptable (for example, a cost of recycling a recyclable product is likely to exceed a value of an estimated amount of materials recovered from it), then a manufacturer, vendor or distributor installing the communications device in a recyclable product, may pay a recycling fee 1706 to the recycling entity in addition to a cost of the communications device. In some embodiments, the recycling fee can be transferred in whole or in part from the manufacturer (or a contracted party) to the recycling entity. In some embodiments, the manufacturer, vendor or distributor may as a result be absolved from recycling or take back obligations. In some embodiments the recycling fee may be held in escrow and pass only to the recycling entity if they are unable to recover their costs from the recover materials form the recyclable product.

As will be appreciated from the embodiments described above, the embodiments can provide an arrangement in which a third party can be trusted to recycle a product where the third party may be different from the manufacturer. As such a user can select the third party from a range of possible recycling companies with a confidence that the tracking arrangement provided by the example embodiments can be used to ensure that the product is recycled correctly. Furthermore the manufacturer can provide the recycling capability to purchasers and users of the product.

It will be appreciated by a person skilled in the art that the sequence of the transmission and reception of information as indicated in the Figures above can be changed. The sequence of the transmission and the reception of information indicated in the Figures above are sequences in exemplary embodiments and are not intended to restrict the order in which transmission and/or reception is to be carried out. It will also be appreciated that any of the above embodiments may be applied to a recyclable product with multiple communications devices associated with multiple sub-assemblies in a recyclable product, such as IoT devices 120 and 130 being associated with the screen 126 and internal circuitry of a TV 100 (FIG. 2). In this way, individual sub-assemblies of the recyclable product which survive the recycling process may be tracked even after the recycling process.

The following numbered paragraphs provide further example aspects and features of the present technique:

Paragraph 1. A method of tracking a recyclable product, the method comprising activating one or more communications devices embedded within or attached to at least one part of the recyclable product, the one or more communications devices including circuitry configured to monitor a location of the at least one part of the recyclable product, and to communicate via a wireless communications network;

in response to the activating the one or more communications devices switching the one or more communications devices from an inactive state in which the one or more communications devices do not transmit an indication of the location of the at least one part of the recyclable product to a recycling state in which the one or more communications devices transmit the indication of the location of the at least one part of the recyclable product to a tracking entity via the wireless communications network.

Paragraph 2. A method according to paragraph 1, wherein the one or more communications devices transmit an identification of the recyclable product or an identification of at least one part of the recyclable product with the indication of the location of the at least one part of the recyclable product to the tracking entity via the wireless communications network.

Paragraph 3. A method according to paragraph 1 or 2, wherein the tracking entity is a server configured to receive and to store the indication of the location of the at least one part of the recyclable product with the identification of the recyclable product or the at least one part of the recyclable product, the indication of the location of the at one least part of the recyclable product being accessible on the server via a communications network or the wireless communications network with which the one or more communications devices communicate.

Paragraph 4. A method according to paragraph 1, wherein the tracking entity is a communications device configured to access the server via the communications network or the wireless communications network.

Paragraph 5. A method according to paragraph 3, wherein the communications device configured to access the server via the communications network or the wireless communications network is a smart phone.

Paragraph 6. A method according to any of paragraphs 1 to 5, comprising transmitting to the tracking entity via the wireless communications network, composition information regarding the materials comprising the recyclable product with the indication of the location of the at least one part of the recyclable product by the one or more communications devices.

Paragraph 7. A method according to any of paragraphs 1 to 6, comprising receiving, by the one or more communications devices, recycling instructions provided by a manufacturer of the recyclable product for recycling the recyclable product.

Paragraph 8. A method according to any of paragraphs 1 to 7, wherein the activating the one or more communications devices comprises
    activating a switch of the recyclable product or the one or more communications devices.

Paragraph 9. A method according to any of paragraphs 1 to 7, wherein the activating the one or more communications devices comprises
    receiving a signal transmitted by the tracking entity via the wireless communications network, the signal being detected by the one or more communications devices to active the one or more communications devices.

Paragraph 10. A method according to any of paragraphs 1 to 7, wherein the activating the one or more communications devices comprises
    receiving an activation signal at a network interface of the one of more communications devices.

Paragraph 11. A method according to any of paragraphs 8, 9 and 10, wherein the activating the one or more communications devices includes
    switching to an independent power supply.

Paragraph 12. A method according to any of paragraphs 1 to 11, wherein each of the one or more communications devices comprise a Global Navigation Satellite System (GNSS) chip for monitoring the location of the recyclable product.

Paragraph 13. A method according to any of paragraphs 1 to 12, wherein the one or more communications devices stop transmitting the indication of the location of the least one part of the recyclable product via the wireless communications network after a pre-determined time limit.

Paragraph 14. A method according to any of paragraphs 1 to 11, wherein the one or more communications devices stop transmitting the indication of the location of the least one part of the recyclable product via the wireless communications network when a manufacturer resets the one or more communications devices.

Paragraph 15. A communications device embedded within or attached to at least one part of a recyclable product, the communications device comprising:
    receiver circuitry configured to receive signals;
    transmitter circuitry configured to transmit signals;
    controller circuitry configured to control the transmitter circuitry and the receiver circuitry to transmit or receive signals,
        wherein the controller circuitry is configured to monitor a location of the at least one part of the recyclable product and, in response to the communications device being activated, the communications devices switches from an inactive state in which the communications device does not transmit an indication of the location of the at least one part of the recyclable product to a recycling state in which the controller circuitry is configured in combination with the receiver circuitry to transmit the indication of the location of the at least one part of the recyclable product to a tracking entity via a wireless communications network.

Paragraph 16. A server for operation as a tracking entity for tracking a recyclable product with one or more communications devices attached to or embedded within at least one part of the recyclable product, the server comprising
    a network interface for transmitting information to and receiving information from a communications network, and
    a processor for executing program code, the program code configuring the processor
    to receive, in response to the one or more communications devices being activated, an indication of the location of the least one part of the recyclable product via a wireless communications network.

Paragraph 17. A server according to paragraph 16, wherein the processor is configured to receive request information including a request to recycle the recyclable product from the tracking entity via the network interface.

Paragraph 18. A server according to paragraph 17, wherein the processor is configured to receive disassembly information including information regarding the disassembly of the recyclable product from the at least one recycling entity via the wireless communications network or other communications network.

Paragraph 19. A server according to paragraph 17, wherein the disassembly information comprises an indication of a number of the one or more communications devices embedded within or attached to the at least one part of the recyclable product which were destroyed in a recycling process carried out by the at least one recycling entity.

Paragraph 20. A server according to any of paragraphs 16 to 19, wherein the request information includes a an identification of the recyclable product or the identification of the at least one part of the recyclable product and the processor is configured to use the identification of the recyclable product or the identification of the at least one part of the recyclable product to obtain recycling instructions for the recyclable product from a manufacturer of the recyclable product.

Paragraph 21. A communications device for tracking a recyclable product with one or more communications devices attached to or embedded within at least one part of the recyclable product, the server comprising
    receiver circuitry configured to receive signals
    transmitter circuitry configured to transmit signals
    controller circuitry configured to control the transmitter circuitry and the receiver circuitry to transmit or receive signals,
        wherein the controller circuitry is configured in combination with the receiver circuitry to receive, in response to the one or more communications devices being activated, an indication of the location of the least one part of the recyclable product via a wireless communications network.

Paragraph 22. A server according to paragraph 21, wherein the processor is configured to receive request information including a request to recycle the recyclable product from the tracking entity via the network interface.

Paragraph 23. A server according to paragraph 21, wherein the processor is configured to receive disassembly information including information regarding the disassembly of the recyclable product from the at least one recycling entity via the wireless communications network or other communications network.

Paragraph 24. A server according to paragraph 21, wherein the disassembly information comprises an indication of a number of the one or more communications devices embedded within or attached to the at least one part of the recyclable product which were destroyed in a recycling process carried out by the at least one recycling entity.

Paragraph 25. A server according to any of paragraphs 21 to 24, wherein the request information includes a an identification of the recyclable product or the identification of the at least one part of the recyclable product and the processor is configured to use the identification of the recyclable product or the identification of the at least one part of the recyclable product to obtain recycling instructions for the recyclable product from a manufacturer of the recyclable product.

Paragraph 26. A method performed on a computing device operated by a recycling entity to determine whether to recycle a recyclable product with one or more communications devices embedded within or attached to at least one part of the recyclable product, the method comprising receiving, from a tracking entity via a wireless communications network, an indication of a location of the at least one part of the recyclable product and an identity of at the least the one part of the recyclable product;

calculating, on a basis of at least one of: recycling processes available to the recycling entity, the identity of the at least one part of the recyclable product and the indication of the location of the at least one part of the recyclable product received from the tracking entity, a request parameter to be used to determine whether to recycle the recyclable product.

Paragraph 27. A method according to paragraph 26 comprising receiving, from the tracking entity, a list of recyclable products including an identity and an indication of a location of each of the recyclable products in the list.

Paragraph 28. A method according to paragraph 26 or 27, comprising receiving, from the tracking entity, composition information regarding materials comprising the recyclable product.

Paragraph 29. A method according to any of paragraphs 26 or 27, comprising determining composition information regarding materials comprising the recyclable product on a basis of the identification information received from the server.

Paragraph 30. A method according to any of paragraphs 26 to 29, wherein the request parameter is an estimate of an amount of each of the materials comprising the recyclable product.

Paragraph 31. A method according to any of paragraphs 26 to 30, wherein the request parameter is an estimated cost of travelling to a location of the recyclable product indicated by the indication of the location of the recyclable product received from the tracking entity.

Paragraph 32. A computer program comprising instructions which, when the program is executed by a computer, cause the computer to carry out the method of paragraph 1 or 26.

Paragraph 33. A system for tracking a recyclable product, the system comprising:

a recyclable product with one or more communications devices embedded within or attached to at least one part of the recyclable product, the one or more communications devices including circuitry configured to monitor a location of at least one part of the recyclable product and, in response to being activated, the one or more communications devices switch from an inactive state in which the one or more communications devices do not transmit an indication of the location of the at least one part of the recyclable product to a recycling state in which the one or more communications devices transmit the indication of the location of the at least one part of the recyclable product to a tracking entity via a wireless communications network;

the tracking entity configured to receive the indication of the location of the at least one part of the recyclable product from the one or more communications devices via the wireless communications network;

a computing device operated by a recycling entity configured to receive, from the tracking entity via the wireless communications network or another communications network, the indication of the location of the at least one part of the recyclable product and an identity of the at least one part of the recyclable product and, to calculate, on a basis of at least one of: recycling processes available to the recycling entity, the identity of the at least one part of the recyclable product and the indication of the location of the at least one part of the recyclable product received from the tracking entity, a request parameter to be used to determine whether to recycle the recyclable product.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

The invention claimed is:

1. A method of tracking a recyclable product, the method comprising
activating one or more communications devices embedded within or attached to at least one part of the recyclable product, the one or more communications devices including circuitry configured to monitor a location of the at least one part of the recyclable product, and to communicate via a wireless communications network;
in response to the activating the one or more communications devices:
switching the one or more communications devices from an inactive state in which the one or more communications devices do not transmit an indication of the location of the at least one part of the recyclable product to a recycling state in which the one or more communications devices transmit the indication of the location of the at least one part of the recyclable product to a tracking entity via the wireless communications network, wherein the indication of the location is transmitted in configurable time slots for specific durations; and
transmitting, by the one or more communications devices to the tracking entity via the wireless communications network, composition information regarding materials comprising the recyclable product with the indication of the location of the at least one part of the recyclable product, wherein the composition information is stored on the one or more communications devices.

2. The method according to claim 1, wherein the one or more communications devices transmit an identification of the recyclable product or an identification of at least one part of the recyclable product with the indication of the location of the at least one part of the recyclable product to the tracking entity via the wireless communications network.

3. The method according to claim 2, wherein the tracking entity is a server configured to receive and to store the indication of the location of the at least one part of the recyclable product with the identification of the recyclable product or the at least one part of the recyclable product, the indication of the location of the at one least part of the recyclable product being accessible on the server via a communications network or the wireless communications network with which the one or more communications devices communicate.

4. The method according to claim 1, wherein the tracking entity is a communications device configured to access a server via the communications network or the wireless communications network.

5. The method according to claim 4, wherein the communications device configured to access the server via the communications network or the wireless communications network is a smart phone.

6. The method according to claim 1, comprising receiving, by the one or more communications devices, recycling instructions provided by a manufacturer of the recyclable product for recycling the recyclable product.

7. The method according to claim 6, wherein the activating the one or more communications devices comprises activating a switch of the recyclable product or the one or more communications devices.

8. The method according to claim 6, wherein the activating the one or more communications devices comprises receiving a signal transmitted by the tracking entity via the wireless communications network, the signal being detected by the one or more communications devices to active the one or more communications devices.

9. The method according to claim 6, wherein the activating the one or more communications devices comprises receiving an activation signal at a network interface of the one of more communications devices.

10. The method according to claim 9, wherein the activating the one or more communications devices includes switching to an independent power supply.

11. The method according to claim 10, wherein each of the one or more communications devices comprise a Global Navigation Satellite System (GNSS) chip for monitoring the location of the recyclable product.

12. The method according to claim 11, wherein the one or more communications devices stop transmitting the indication of the location of the least one part of the recyclable product via the wireless communications network after a pre-determined time limit.

13. The method according to claim 10, wherein the one or more communications devices stop transmitting the indication of the location of the least one part of the recyclable product via the wireless communications network when a manufacturer resets the one or more communications devices.

14. A communications device embedded within or attached to at least one part of a recyclable product, the communications device comprising:
receiver circuitry configured to receive signals;
transmitter circuitry configured to transmit signals; and
controller circuitry configured to control the transmitter circuitry and the receiver circuitry to transmit or receive signals,
wherein the controller circuitry is configured to monitor a location of the at least one part of the recyclable product and, in response to the communications device being activated, the communications device is configured to:
switches from an inactive state in which the communications device does not transmit an indication of the location of the at least one part of the recyclable product to a recycling state in which the controller circuitry is configured in combination with the transmitter circuitry to transmit the indication of the location of the at least one part of the recyclable product to a tracking entity via a wireless communications network, wherein the indication of the location is transmitted in configurable time slots for specified durations, and
transmit, to the tracking entity via the wireless communications network, composition information regarding materials comprising the recyclable product with the indication of the location of the at least one part of the recyclable product, wherein the composition information is stored on the communications device.

15. A server for operation as a tracking entity for tracking a recyclable product with one or more communications devices attached to or embedded within at least one part of the recyclable product, the server comprising
a network interface for transmitting information to and receiving information from a wireless communications network, and
a processor for executing program code, the program code configuring the processor
to receive, from the one or more communications devices, in response to the one or more communications devices being activated:
an indication of the location of the least one part of the recyclable product via a wireless communications network, wherein the indication of the location is received in configurable time slots for specified durations; and composition information regarding materials comprising the recyclable product with the indication of the location of the at least one part of the recyclable product, wherein the composition information received from the one or more communications devices is stored on the one or more communications devices.

16. The server according to claim 15, wherein the processor is configured to receive request information including a request to recycle the recyclable product from the tracking entity via the network interface.

17. The server according to claim 16, wherein the processor is configured to receive disassembly information including information regarding the disassembly of the recyclable product from the at least one recycling entity via the wireless communications network or other communications network.

18. The server according to claim 16, wherein the disassembly information comprises an indication of a number of the one or more communications devices embedded within or attached to the at least one part of the recyclable product which were destroyed in a recycling process carried out by the at least one recycling entity.

19. The server according to claim 18, wherein the request information includes a an identification of the recyclable product or the identification of the at least one part of the recyclable product and the processor is configured to use the identification of the recyclable product or the identification of the at least one part of the recyclable product to obtain recycling instructions for the recyclable product from a manufacturer of the recyclable product.

* * * * *